US011947302B2

(12) United States Patent
Urrutia Nebreda et al.

(10) Patent No.: US 11,947,302 B2
(45) Date of Patent: Apr. 2, 2024

(54) SKEW DETECTION

(71) Applicant: HEWLETT-PACKARD DEVELOPMENT COMPANY, L.P., Spring, TX (US)

(72) Inventors: Martin Urrutia Nebreda, Sant Cugat del Valles (ES); Marti Rius Rossell, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 180 days.

(21) Appl. No.: 17/754,612

(22) PCT Filed: Oct. 25, 2019

(86) PCT No.: PCT/US2019/058015
§ 371 (c)(1),
(2) Date: Apr. 7, 2022

(87) PCT Pub. No.: WO2021/080599
PCT Pub. Date: Apr. 29, 2021

(65) Prior Publication Data

US 2022/0365473 A1 Nov. 17, 2022

(51) Int. Cl.
*G03G 15/00* (2006.01)
*B65H 7/06* (2006.01)

(52) U.S. Cl.
CPC ........... *G03G 15/6567* (2013.01); *B65H 7/06* (2013.01); *B65H 2511/24* (2013.01); *B65H 2553/51* (2013.01); *B65H 2553/82* (2013.01); *B65H 2557/61* (2013.01); *B65H 2801/03* (2013.01)

(58) Field of Classification Search
CPC .. G03G 15/6567; B65H 7/06; B65H 2511/24; B65H 2553/51; B65H 2553/82; B65H 2557/61; B65H 2801/03
See application file for complete search history.

(56) References Cited

U.S. PATENT DOCUMENTS 4,892,426 A 1/1990 Steele
5,609,428 A * 3/1997 Tanaka ..................... B41J 13/10 271/227
5,676,477 A * 10/1997 Tanaka ..................... B41J 13/10 271/227
5,887,996 A * 3/1999 Castelli ................ B41J 11/0055 271/227
(Continued)

FOREIGN PATENT DOCUMENTS

EP 1764751 B1 10/2012
JP 08324834 12/1996
(Continued)

*Primary Examiner* — David H Banh

(57) ABSTRACT

According to some examples, a skew detection device comprises a first roller rotatable around a first axis, a second roller rotatable around a second axis, a first sensor, and a second sensor. The first sensor measures a first rotation parameter from the first roller and the second sensor measures a second rotation parameter from the second roller. A movement of a print media over the device rotates the first contact roller and the second roller, and a controller determines a skew of the print media based on the first and second rotation parameters captured by the first sensor and the second sensor.

15 Claims, 6 Drawing Sheets

100

(56) References Cited

U.S. PATENT DOCUMENTS

| | | | | | |
|---|---|---|---|---|---|
| 6,125,754 | A * | 10/2000 | Harris | B65H 23/34 226/7 |
| 6,250,220 | B1 * | 6/2001 | Sainio | B65H 23/0256 101/DIG. 42 |
| 6,467,689 | B1 | 10/2002 | Kaji | |
| 6,637,634 | B1 | 10/2003 | Yeo et al. | |
| 7,416,182 | B2 | 8/2008 | Nishida et al. | |
| 7,806,404 | B2 | 10/2010 | DeJong et al. | |
| 8,205,880 | B2 | 6/2012 | Kimura et al. | |
| 8,870,180 | B2 | 10/2014 | Le | |
| 9,144,965 | B2 * | 9/2015 | Dim | B41J 11/001 |
| 2004/0178571 | A1 * | 9/2004 | Ohama | B65H 29/14 271/272 |
| 2010/0098471 | A1 | 4/2010 | Satoh et al. | |
| 2010/0327518 | A1 * | 12/2010 | Tharayil | B65H 7/10 271/226 |
| 2013/0241141 | A1 * | 9/2013 | Karikusa | B65H 5/062 271/227 |
| 2020/0255241 | A1 * | 8/2020 | Hirahara | B65H 9/166 |

FOREIGN PATENT DOCUMENTS

| | | |
|---|---|---|
| JP | 2017171402 | 9/2017 |
| JP | 2018118826 | 8/2018 |
| KR | 101802633 | 11/2017 |

* cited by examiner

SKEW DETECTION

BACKGROUND

During a printing operation, print media may become skewed relative to a media path. Skewed print media may cause misalignment of a printed image, media jam or even damages to the print media, such as wrinkles. To prevent this, skew detection sensors have been developed to determine whether print media is skewed. By detecting media skew, printing operations may be modified to prevent damage.

BRIEF DESCRIPTION OF DRAWINGS

Features of the present disclosure are illustrated by way of example and are not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to.

In the examples herein, the term print media may comprise any media which may be printed on. Some examples of print media may include paper, textile, cardboard, wood, tin, and/or metal.

A print media may move in a media direction different than the nominal direction when performing a printing operation. The differences between the nominal direction and the actual direction may be caused by either internal or external factors. An internal factor which may affect the performance may be a type of print media. Since different types of print media may be used within a printing system, different behaviors in the print media may be obtained. On the other hand, an external factor that may affect the performance of the printing system may be the dust. Printing systems may be used in dusty environments, and hence, dust may have a direct impact on the performance of the mechanisms of a printing system.

In order to reduce differences between a nominal result and an actual result, devices, systems and methods have been designed. These devices, systems, and methods can determine whether a media is skewed relative to a reference direction or not. From the determined skew of the media, the printing operation may be modified to reduce the impact of the skew in the final result.

Figure 1:
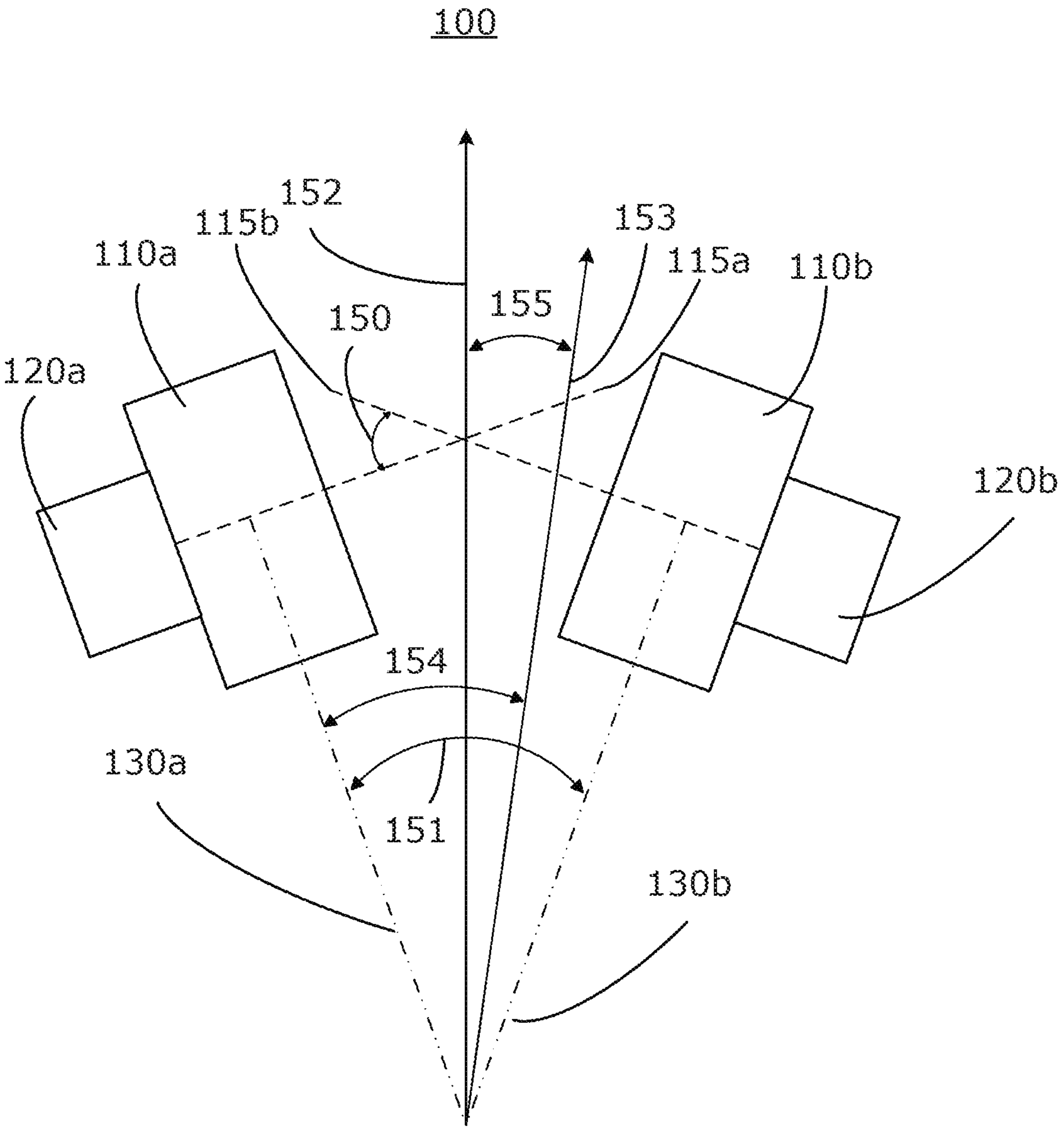
FIG. 1 shows a top view of a skew detection device, according to an example of the present disclosure.

Referring now to FIG. 1, a skew detection device 100 comprises a first contact roller 110*a*, a second contact roller 110*b*, a first sensor 120*a*, and a second sensor 120*b*. The first contact roller 110*a* is rotatable around a first axis 115*a* and the second contact roller 110*b* is rotatable around a second axis 115*b*, wherein the first axis 115*a* and the second axis are not parallel and converge forming an angle 151. The first sensor 120*a* captures a first rotation parameter from the first roller 110*a* and the second sensor 120*b* captures a second rotation parameter from the second roller 110*b*. In an example, the first and the second parameters comprise an angular displacement. The first dashed line 130*a* and the second dashed line 130*b* are perpendicular respectively to each of the first axis 115*a* and the second axis 115*b*, forming a configuration angle 151 which is equal to the angle 150. The configuration angle may be comprised in a range between 0.5 degrees and 5 degrees, for instance. In other examples, the configuration angle may be comprised in a range between 0.5 and 2 degrees.

While a print media is moving over the skew detection device 100, contact between the print media and the rollers may cause a rotation of the first contact roller 110*a* and second contact roller 110*b* around the first axis 115*a* and the second axis 115*b*. The first sensor 120*a* and the second sensor 120*b* capture the first and second parameters from the first contact roller 110*a* and the second contact roller 110*b*. A controller (not shown in FIG. 1), in communication with the first sensor 120*a* and the second sensor 120*b*, determines if a print media is skewed based on the first parameter and the second parameter. In other examples, the controller may further calculate a degree of skew as a skew angle and/or a calibration value to adjust a printing operation.

As depicted in FIG. 1, the skew detection device 100 determines through a controller an actual media direction 153. A deviation angle 154 is formed between the first dashed line 130*a* and the media direction 153. A nominal media path direction 152, i.e., the expected direction of the media during a normal print operation (without skewed media), forms a skew angle 155 with the actual media direction 153. If the actual media direction 153 is not parallel to the nominal media path direction 152, the print media is considered to be skewed. In contrast, if the media direction 153 is parallel to the media path direction 152, the print media is considered as not skewed. In the example of FIG. 1 a bisector of the angle 150 is to the media path direction 152, however, in other examples, the media path direction 152 may have a different orientation from that depicted in FIG. 1.

A skew detection device as shown in FIG. 1 may be positioned in a media path at different positions and/or configurations. The different positions may enable to measure a skew at different stages of the printing operation and the different configurations may allow the media direction to be measured in an accurate way. In FIG. 1 shows a "V-shape" configuration, however, other configurations such as "/\-shape" (or inverted V shape) are also possible. The skew detection device may be positioned upstream of the printing operation, hence, enabling to determine a skew in the print media before executing an action over the print media.

Throughout this description, the media path direction term will be used to refer to a direction in which a print media should move while performing a printing operation.

Figure 2:
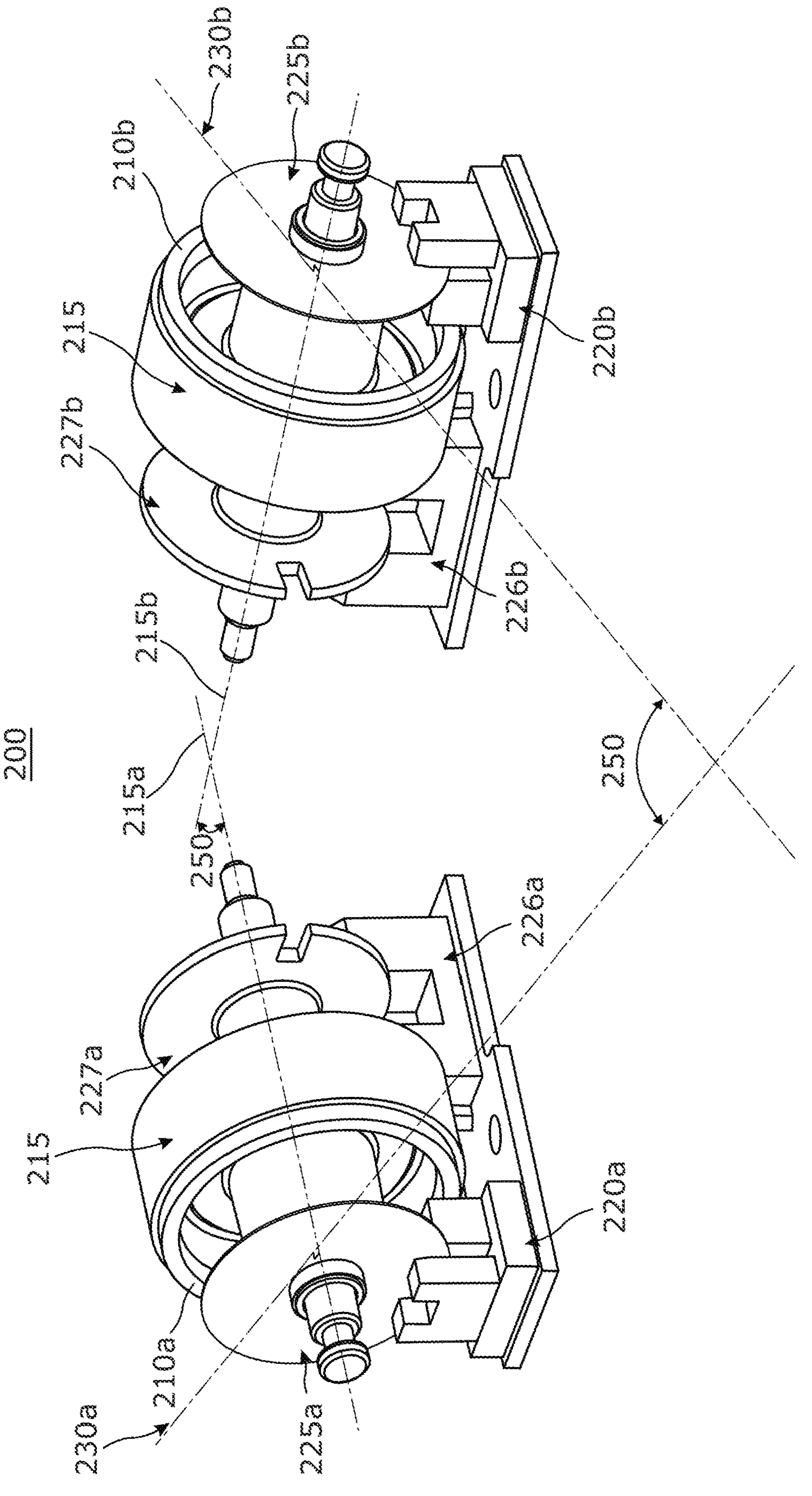
FIG. 2 shows a skew detection device, according to an example of the present disclosure.

Referring now to FIG. 2, a skew detection device 200 is represented. The skew detection device 200 may comprise a first contact roller 210*a*, a second contact roller 210*b*, a first sensor 220*a*, and a second sensor 220*b*. The first contact roller 210*a* is rotatable around a first axis 215*a* and the second contact roller 210*b* is rotatable around a second axis 215*b*. In FIG. 2, the first contact roller 210*a* and the second contact roller 210*b* form an angle 250, and hence, the first axis 215*a* is not parallel to the second axis 215*b*. For the purposes of illustration, a first dashed line 230*a* and a second dashed line 230*b* are shown in FIG. 2 as perpendicular to each of the first axis 215*a* and the second axis 215*b*, hence, intersecting at the angle 250. The first axis 215*a*, the second axis 215*b*, the first dashed line 230*a*, and the second dashed line 230*b* lie in a plane. In an example, a print media is moving in a plane parallel to the plane in which the first axis 215*a*, the second axis 215*b*, the first dashed line 230*a* and the second dashed line 230*b* lie.

The first contact roller 210*a* and the second contact roller 210*b* comprise contact surfaces 215. The contact surfaces 215 may be made of a material having mechanical properties to enable proper frictional contact between the print media and the contact roller. Contact between the contact surfaces 215 and the media enables the rotation of each of the first contact roller 210*a* and the second contact roller 210*b* while the media moves over the skew detection device 200. In an example, the material of the contacting surfaces 215 is ABS.

The first sensor 220*a* and the second sensor 220*b* may capture a first parameter and a second parameter from each of the first encoder 225*a* and the second encoder 225*b*. The first encoder 225*a* is attached to the first contact roller 210*a* and the second encoder 225*b* is attached to the second contact roller 210*b*. In an example, the first parameter and the second parameter comprise an angular displacement of each of the first encoder 225*a* and the second encoder 225*b*. The first sensor 220*a* and the second sensor 220*b* may comprise optical encoders to measure the displacement. However, other alternatives may be possible.

In the example of FIG. 2, the skew detection device 200 further comprises a first reference encoder 227*a* and a second reference encoder 227*b* attached to each of the first contact roller 210*a* and the second contact roller 210*b*. A first reference sensor 226*a* and a second reference sensor 226*b* determine a rotation of the first reference encoder 227*a* and the second reference encoder 227*b*. Each reference encoder comprises an indentation. From an encoder's rotation, a correction value is determined for each roller. The correction values can be applied to the measurements of the first sensor 220*a* and the second sensor 220*b*. Since the first sensor 220 and the second sensor 220*b* may need to be referenced, having the correction value of the first reference encoder 227*a* and the second reference encoder 227*b* enables the correction of the measurements. However, in other examples, the skew detection device 200 does not comprise the reference encoders.

In order to increase the accuracy of the skew detection device, a plurality of skew detection devices may be used instead of one. The plurality of skew detection devices may comprise at least two skew detection devices aligned in a direction perpendicular to the media path direction. However, other configurations for the plurality of skew detection devices may be possible, such as a staggered distribution. By determining in each of the skew detection devices the first and the second parameter, the controller may determine if the print media is skewed from an average first parameter and an average second parameter. In some other examples, the controller may determine a calibration value and/or a skew angle based on the average first parameter and the average second parameter captured by the plurality of skew detection devices.

Figure 3A:
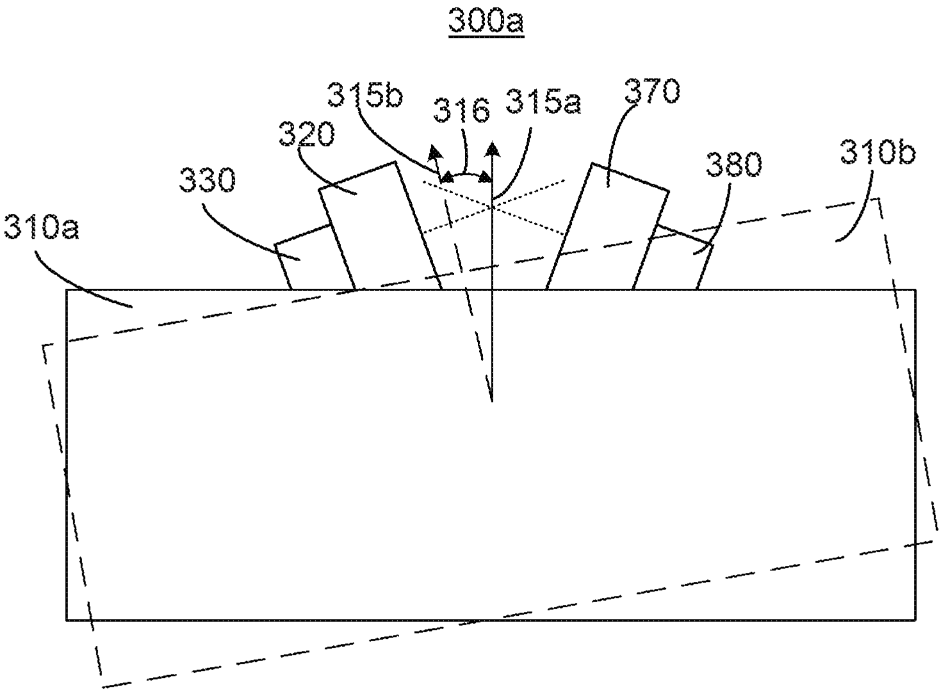
FIG. 3*a* shows a top view of a skew detection device to determine a skew in a print media, according to an example of the present disclosure.

Referring now to FIG. 3*a*, a skew detection device 300*a* is shown. The skew detection device 300*a* comprises a first contact roller 320, a second contact roller 370, a first sensor 330 and a second sensor 380. A first print media 310*a* is moving over the skew detection device 300*a*, contacting the first contact roller 320 and the second contact roller 370. A controller (not shown in FIG. 3*a*), determines that the first print media 310*a* is moving in a media direction 315*a*. Since the first print media 310*a* is moving in a direction parallel to the media path direction, the first print media 310*a* is considered as not skewed.

However, the skew detection device 300*a* may determine from the measurements of the first sensor 330 and the second sensor 380 that a second print media 310*b* is skewed. The controller may determine a second media direction 315*b* for the second print media 310*b*. A skew angle 316 may be formed between the media direction 315*a* and the second media direction 315*b*.

In other examples, a print media may be considered as skewed when a skew threshold is exceeded. The skew threshold may be set as a maximum difference between the measurements of each of the first sensor(s) and the second sensor(s).

Figure 3B:
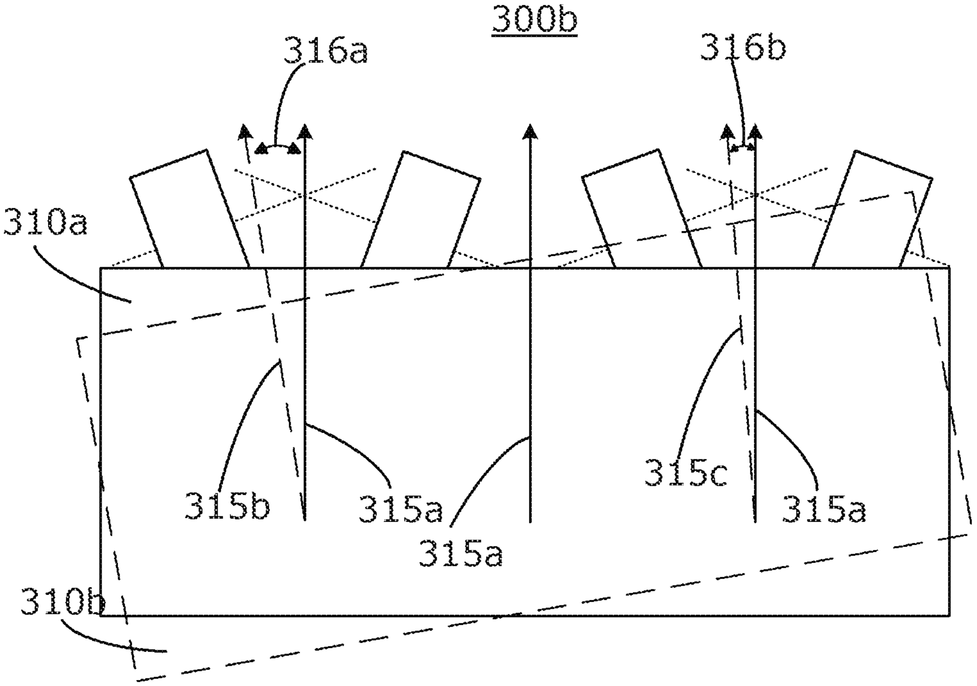
FIG. 3*b* shows a top view of a plurality of skew detection devices to determine a skew in a print media, according to an example of the present disclosure.

Referring now to FIG. 3*b*, a plurality of skew detection devices 300*b* is shown. The media path direction 315*a* indicates a direction in which a first print media 310*a* is having a null skew. The first skew detection device and the second skew detection device, through each of the first sensor and the second sensor, send the first parameters and second parameters to a controller. The controller determines the averages values for the first parameters and the second parameters in order to determine whether a print media is skewed. When a second print media 310*b* is moving over the plurality of skew detection devices 300*b*, the first skew detection device determines a first media direction 315*b* and the second skew detection device determines a second media direction 315*c*. A first skew angle 316*a* is calculated for the first skew detection device and a second skew angle 316*b* is calculated for the second skew detection device. As represented in FIG. 3*b*, the first skew angle 316*a* is greater than the second skew angle 316*b*. The controller may determine the skew angle average value for the second print media.

Figure 4:
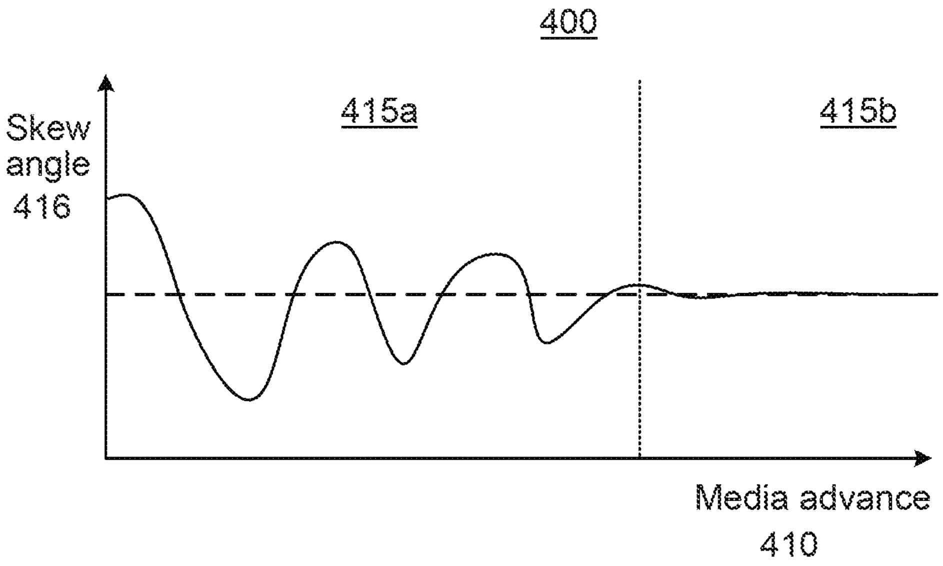
FIG. 4 shows a graph representing a skew angle related to a media advance, according to an example of the present disclosure.

Referring now to FIG. 4, a graph 400 shows a behavior of a print media skew angle within a printing system. A skew angle for a print media may oscillate before stabilizing when it is first loaded in a printing system. The Y-axis of the graph 400 shows a skew angle 416, and the X-axis represents a media movement 410. The media movement 410 may be defined as the movement of the print media within a printing system when performing a printing operation. Before reaching a steady-state 415*b*, the print media may be in a transient state 415*a*, in which the skew angle 416 oscillates. In the steady-state 415*b*, the skew angle 416 stabilizes at a value. The skew angle obtained in the steady-state 415*b* may be used to obtain the calibration value for the remaining printing operation. However, the skew angle(s) obtained during the transient state 415*a* may be used to calibrate the printing operation through a calibration value.

Figure 5:
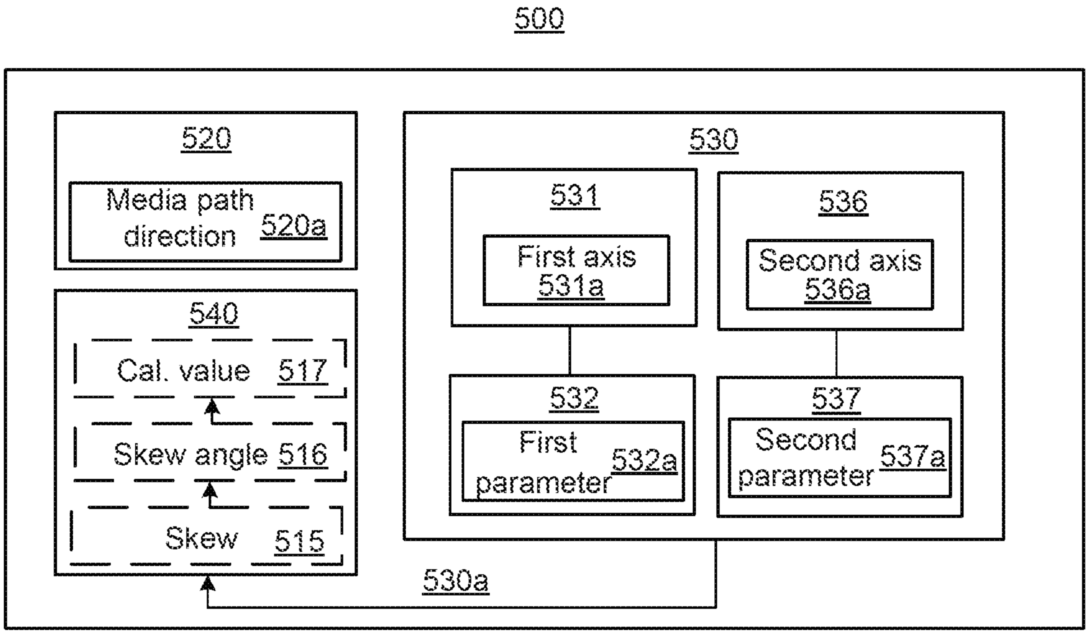
FIG. 5 schematically shows a printing system comprising a skew detection device, according to an example of the present disclosure.

Referring now to FIG. 5, a printing system 500 comprising a print media 520, a skew detection device 530 and a controller 540 is represented. The print media 520 is within a media path having a media path direction 520*a* and contacts the skew detection device 530 while moving. The skew detection device 530 comprises a first contact roller 531, a second contact roller 536, a first sensor 532, and a second sensor 537. The first contact roller 531 and the second contact roller 536 are rotatable around a first axis 531*a* and a second axis 536*a*, respectively. The first contact roller 531 and the second contact roller 536 are angled relative to the media path direction 520*a*. However, in other examples, one of the first contact roller and the second contact roller are angled relative to the media path direction forming an angle with each other. The first sensor 532 measures a first rotation parameter 532*a* from the first contact roller 531 and the second sensor 537 measures a second rotation parameter 537*a* from the second contact roller 536. In an example, the first rotation parameter 532*a* and the second rotation parameter 537*a* comprise an angular displacement of the roller.

The controller 540 is in communication with the skew detection device 530. A signal 530*a* is sent by the skew detection device 530 to the controller 540, the signal 530*a* being associated to the first rotation parameter 532*a* and the second rotation parameter 537*a*. The controller 540 determines a skew 515 of the print media 520 based on the signal 530*a*, for example, based on the first parameter 532*a* and the second parameter 537*a*. From the skew 515, the controller 540 may determine a degree of skew as a skew angle 516. From the skew angle 516, a calibration value 517 may be determined. The calibration value 517 may be used to adjust a printing operation performed by the printing system 500. In other examples, the controller 540 may directly determine the calibration value 517 from the skew 515, without determining the skew angle 516.

In the printing system 500 of FIG. 5 is represented as a single skew detection device 530, however, a plurality of skew detection devices may be possible. As explained previously in the description, having a plurality of skew detection devices within the printing system 500 may allow a series of first parameters and second parameters to be measured. These series of first and second parameters may be comprised within the signal 530*a*. In other examples, the controller 540 may further apply other adjustments in the printing operation based on printing system characteristics.

Figure 6:
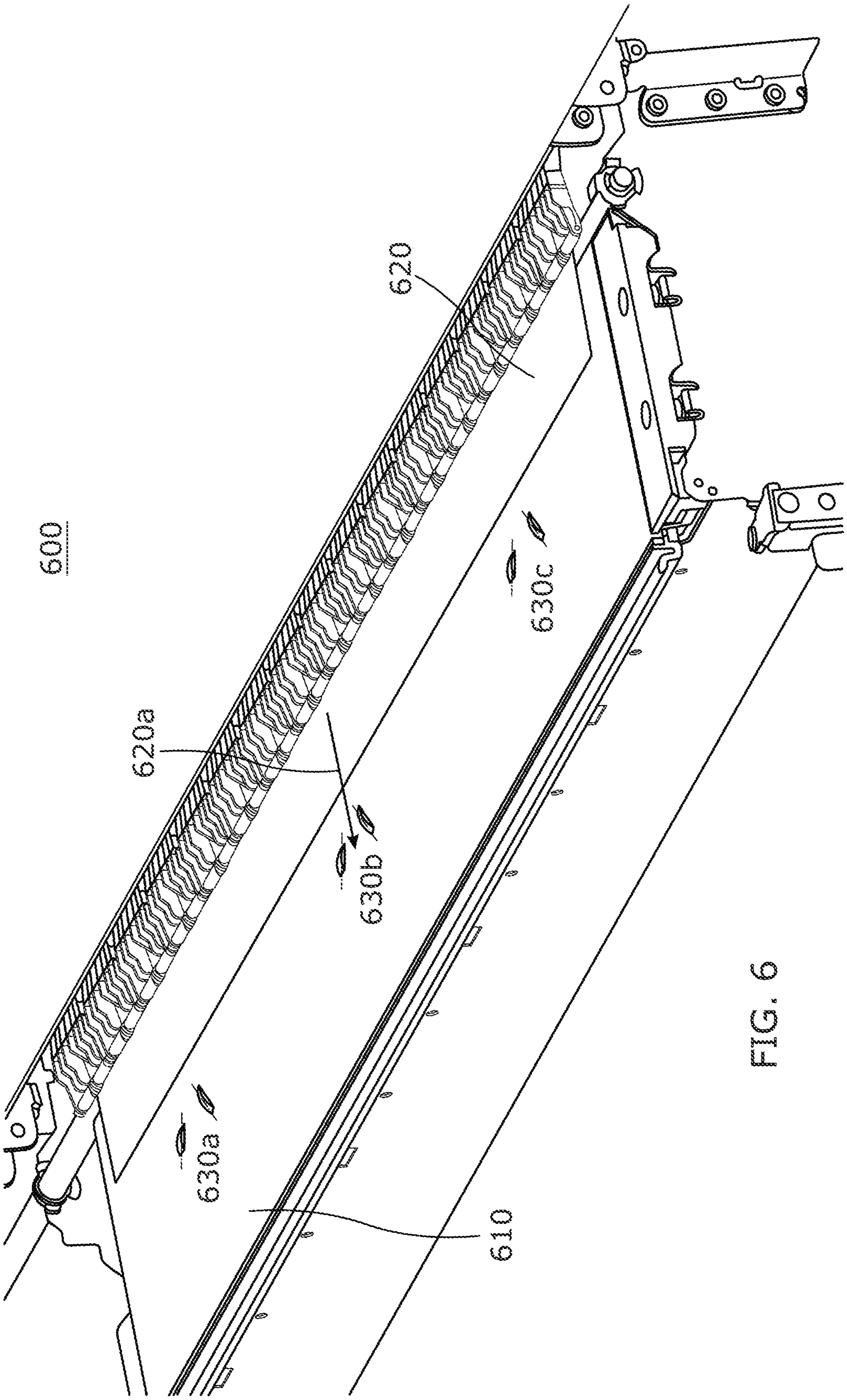
FIG. 6 shows a printing system comprising a plurality of skew detection devices, according to an example of the present disclosure.

Referring now to FIG. 6, a printing system 600 performing a printing operation is shown. A print media 620 moves over a platen 610 having a media path direction 620*a*. In the example of FIG. 6, the print media 620 is moving parallel to the platen 610. A plurality of skew detection devices 630*a*, 630*b* and 630*c* are within a media path, the skew detection devices being positioned upstream the printing operation. The first axis and the second axis of each of the skew detection devices are not parallel, and hence, are forming a configuration angle as described previously in FIG. 1. As depicted in FIG. 6, portions of the contact rollers protrude from the platen 610.

Each skew detection device 630*a*, 630*b*, and 630*c* is in communication with a controller (not represented in FIG. 6), the controller to determine a skew of the print media 620*a*. The controller may further determine a skew angle and/or a calibration value. The printing operation may be adjusted based on the calibration value determined by the controller. In an example, the printing operation comprises scanning or printing.

In the example represented in FIG. 6, the skew detection devices are positioned in a “V” configuration, however, other alternatives such as “/\” configuration are possible. In other examples, the skew detection devices 630*a*, 630*b*, and 630*c* may not be symmetrically disposed relative to the media path direction 620*a*.

Figure 7:
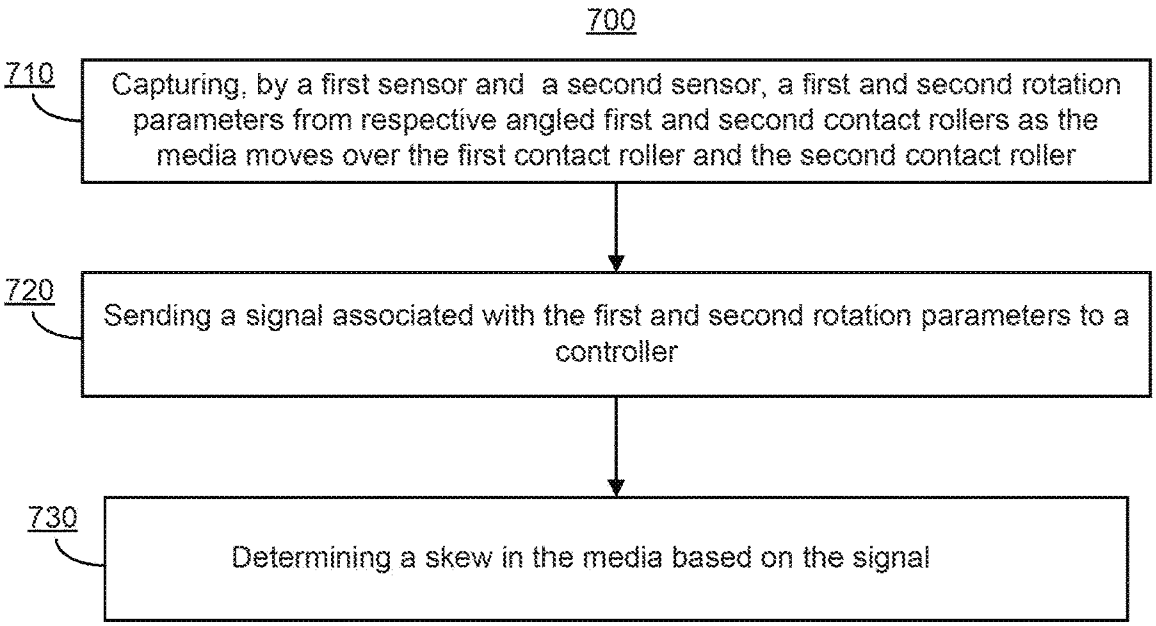
FIG. 7 shows a method to determine a skew in a print media, according to an example of the present disclosure.

Referring now to FIG. 7, a method 700 to determine a skew in a print media during a printing operation is represented. The method 700 comprises capturing 710 a first and second parameters from a pair of angled first and second contact rollers, sending 720 a signal associated with the first and the second rotation parameters to a controller, and determining 730 a skew in the print media based on the signal. A first sensor and a second sensor capture from the first contact roller and the second contact roller the first and the second rotation parameters. In an example, the first and the second parameters comprise an angular displacement of the rollers. The first contact roller is rotatable around a first axis and the second contact roller is rotatable around a second axis, wherein the first and the second axis lie in a plane parallel to the print media. Contact between the print media and the first and second contact rollers may cause the rollers to rotate as the print media is moving over the rollers.

In other examples, the controller may calculate a skew angle and/or a calibration value based on the signal. By comparing the first rotation parameter with the second rotation parameter, the skew angle and/or a calibration value may be determined. The comparison may comprise applying a correction to each of the first rotation parameter and the second rotation parameters. The correction may be obtained by other measuring means from the first and second contact rollers. In an example, the correction is obtained from the first reference encoder 227*a* and the second reference encoder 227*b* comprised in the skew detection device 200 of FIG. 2.

Figure 8:
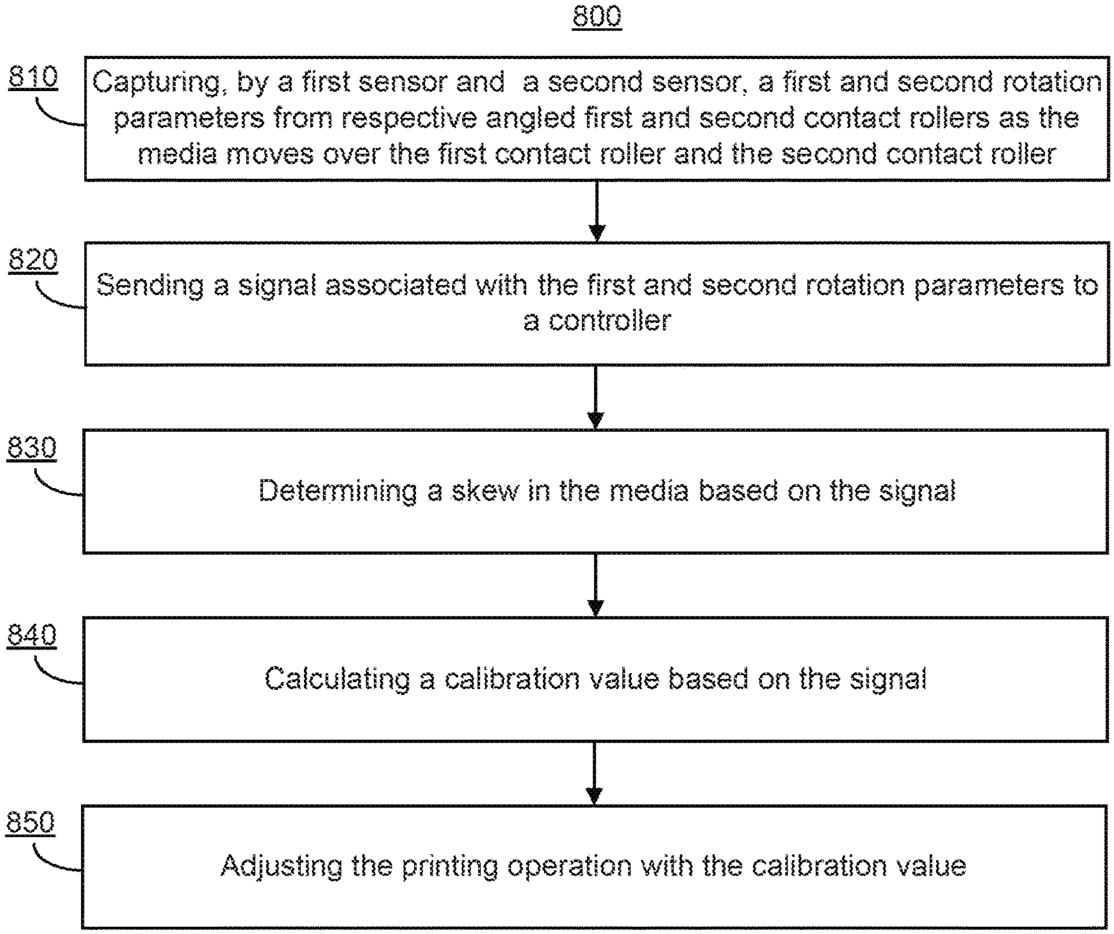
FIG. 8 shows a method to determine skew detection in a print media comprising calculating a calibration value, according to an example of the present disclosure.

Referring now to FIG. 8, a method 800 to determine a skew in a print media is represented. The method 800 comprises the method previously described with reference to FIG. 7, such as capturing 810, sending 820 and determining 830. The method 800 further comprises the steps of calculating 840 a calibration value based on the signal and adjusting 850 the printing operation with the calibration value. The calibration value may correct the skew deficiencies in a printing operation, such as printing or scanning. In an example, the method further includes applying a correction to the calibration value, as explained above.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

The invention claimed is:

1. A skew detection device to determine a skew of a print media in a media path, the device comprising:

a first contact roller rotatable around a first axis;

a second contact roller rotatable around a second axis, the first contact roller and the second contact roller being positioned so that the first axis and the second axis are not parallel, wherein the first axis and the second axis lie in a plane parallel to the print media;

a first sensor to measure a first rotation parameter of the first contact roller, and;

a second sensor to measure a second rotation parameter of the second contact roller, wherein a movement of the print media over the device rotates the first contact roller and second contact roller, and wherein the first sensor and the second sensor are in communication with a controller to determine the skew of the print media based on the first rotation parameter and the second rotation parameter.

2. A device as claimed in claim 1, wherein a bisector of the angle between the first axis and the second axis is perpendicular to a media path direction.

3. A device as claimed in claim 1, wherein the first rotation parameter and the second rotation parameter comprise an angular displacement.

4. A device as claimed in claim 3, wherein the first axis and the second axis form an angle comprised in the range between 0.5 degrees and 5 degrees.

5. A device as claimed in claim 1, wherein the controller determines a skew angle of the movement of the print media relative to a media path direction.

6. A device as claimed in claim 3, wherein the controller calculates a calibration value based on the skew of the print media.

7. A printing system comprising a print media having a media path direction, the printing system comprising:

a skew detection device in the media path, the device to determine a skew in the print media, wherein the device comprises:

a first contact roller rotatable around a first axis;

a second contact roller rotatable around a second axis, wherein one of the second contact roller and the first contact roller are angled relative to the media path direction so that the first axis and the second axis lie in a plane parallel to the print media and are not parallel;

a first sensor to measure a first rotation parameter of the first contact roller, and;

a second sensor to measure a second rotation parameter of the second contact roller, and;

a controller in communication with the first sensor and the second sensor, the controller to determine the skew in the print media based on the first rotation parameter and the second rotation parameter.

8. A printing system as claimed in claim 7, wherein the first contact roller and the second contact roller are symmetrically disposed relative to the media path direction.

9. A printing system as claimed in claim 7, wherein the first rotation parameter and the second rotation parameter comprise an angular displacement.

10. A printing system as claimed in claim 7, wherein the controller further determines a skew angle relative to the media path direction.

11. A printing system as claimed in claim 8, wherein the angle is in the range comprised between 0.5 degrees and 5 degrees.

12. A printing system as claimed in claim 9, wherein a calibration value is calculated by the controller based on the skew angle.

13. A method to determine a skew in a print media during a printing operation, the method comprising:

capturing, by a first sensor and a second sensor, a first and second rotation parameters from a pair of angled first and second contact rollers as the print media moves over the first contact roller and the second contact roller, the movement causing the first contact roller and the second contact roller to rotate, wherein the first contact roller rotates around a first axis and the second contact roller rotates around a second axis, the first axis and the second axis lie in a plane parallel to the print media;

sending a signal associated with the first rotation parameter and the second rotation parameter to a controller, the controller being in communication with the first sensor and the second sensor, and;

determining the skew of the print media by the controller based on the signal.

14. A method as claimed in claim 13, the method further comprising:

calculating a calibration value based on the signal, and;

adjusting the printing operation with the calibration value.

15. A method as claimed in claim 13, wherein the controller calculates a skew angle by comparing the first rotation parameter with the second rotation parameter, wherein comparing comprises applying a correction to each of the first rotation parameter and the second rotation parameter.

* * * * *